(12) United States Patent
Palmeter (10) Patent No.: US 12,296,606 B2
(45) Date of Patent: *May 13, 2025

(54) COMPUTER-READABLE MEDIUM CONFIGURED TO MARK OBJECTS

(71) Applicant: Samuel Palmeter, Caro, MI (US)

(72) Inventor: Samuel Palmeter, Caro, MI (US)

(*) Notice: Subject to any disclaimer, the term of this patent is extended or adjusted under 35 U.S.C. 154(b) by 181 days.

This patent is subject to a terminal disclaimer.

(21) Appl. No.: 17/971,594

(22) Filed: Oct. 22, 2022

(65) Prior Publication Data

US 2023/0406007 A1    Dec. 21, 2023

Related U.S. Application Data

(63) Continuation-in-part of application No. 17/842,218, filed on Jun. 16, 2022.

(51) Int. Cl.
*B41J 2/44* (2006.01)
*B23K 26/03* (2006.01)
(Continued)

(52) U.S. Cl.
CPC ........... *B41J 3/4073* (2013.01); *B23K 26/032* (2013.01); *B23K 26/0342* (2015.10);
(Continued)

(58) Field of Classification Search
CPC ..... B41J 2/435; B41J 2/44; B41J 2/442; B41J 2/47; B41J 2/475; B41J 2/447; B41J 2/455; B41J 3/407; B41J 3/4073; B23K 26/03; B23K 26/032; B23K 26/0342; B23K 26/064; B23K 26/0648; B23K 26/362; B23K 26/364; B23K 26/083; B23K 26/0838; B65B 61/02; B65B 61/025; B65D 85/30; B65D 85/32

See application file for complete search history.

(56) References Cited

U.S. PATENT DOCUMENTS

2006/0197826 A1*  9/2006  Assa ................. B23K 26/0622
                                                      347/247
2008/0223834 A1*  9/2008  Griffiths ................. A01K 43/10
                                                      219/121.68
(Continued)

FOREIGN PATENT DOCUMENTS

JP      2016069025 A  *  5/2016

*Primary Examiner* — Justin Seo
*Assistant Examiner* — Kendrick X Liu
(74) *Attorney, Agent, or Firm* — INVENTA CAPITAL Group DL (57) ABSTRACT

A computer-readable medium configured to store instructions for marking one or more items by an object marking system having a conveyor assembly, a laser etching unit, a laser distance sensor, an inductive proximity sensor, and a controller, the instructions comprising delivering, via the conveyor assembly, a container having the one or more items stored therein, the conveyor assembly having a conveyor line and a conveyor drive, the conveyor line including a first portion and a second portion, the second portion defining a marking position of the one or more items; receiving the container on the second portion of the conveyor line; detecting, via the laser distance sensor, the one or more items by measuring a distance from and differentiating between a low surface and a high surface.

6 Claims, 9 Drawing Sheets

(51) Int. Cl.
  *B23K 26/06*   (2014.01)
  *B23K 26/08*   (2014.01)
  *B23K 26/364*  (2014.01)
  *B41J 2/455*   (2006.01)
  *B41J 2/47*    (2006.01)
  *B41J 2/475*   (2006.01)
  *B41J 3/407*   (2006.01)
  *B65B 61/02*   (2006.01)
  *B65D 85/32*   (2006.01)

(52) U.S. Cl.
  CPC ...... *B23K 26/0648* (2013.01); *B23K 26/0838* (2013.01); *B23K 26/364* (2015.10); *B41J 2/442* (2013.01); *B41J 2/455* (2013.01); *B41J 2/47* (2013.01); *B41J 2/475* (2013.01); *B65B 61/025* (2013.01); *B65D 85/32* (2013.01)

(56) References Cited

U.S. PATENT DOCUMENTS

| | | | |
|---|---|---|---|
| 2011/0177206 A1* | 7/2011 | Anderson | B65D 85/32 426/119 |
| 2016/0221356 A1* | 8/2016 | Phillips | B23K 26/0006 |
| 2023/0256545 A1* | 8/2023 | Palmeter | B23K 26/362 219/121.68 |

* cited by examiner

COMPUTER-READABLE MEDIUM CONFIGURED TO MARK OBJECTS

FIELD OF THE INVENTION

The inventions described herein is related generally to the field of food product processing, and more particularly to systems and methods for laser marking of eggs.

BACKGROUND OF PRIOR ART

Laser marking, such as, for example, laser coding is one of methods for the identification of production in the food industries has been used for years. A clear coding should be marked on the package of foods, so the consumers can be aware of the freshness of foods and expire date. Ink printing methods are usually adopted for coding products, but the methods will accompany the problems that the chemical pollution is kept on foods and the signs cannot directly be marked on the surface of foods. Alternatively, a laser coding can directly mark characters and figures on the foods.

Alluding to the back, Arabic number has been successfully marked on the surface of eggshell in this paper. In order to measure the dimension and the quality of the marking results, the scanning electron microscope (SEM) is used to measure the surface and cross-section of the eggshell. The depth of the marking results is approximately fourth of the eggshell thickness. According to the experimental results, the laser coding method does not cause damage to the bottom of the eggshell and the heat affect zone (HAZ) does not influence the egg theca.

One of the prior art references, such as Patent Publication No. DE102008048355, teaches a device having a holder for an egg, a packing machine, a package for the hen's egg, and an application unit designed as a three- or four lines inkjet printer for application of advertising information on the hen's egg using alcohol-containing ink. The three- or four lines inkjet printer is arranged in front or in the packing machine. The advertising information are applied in words and/or in a graphical form and/or as representation on an egg side and/or on an egg pole under an angle at left or right in different colors.

Another prior art reference, such as Patent publication No. CN101341992, teaches a laser eggshell marking method which forms larger graphs or characters than the natural color of an egg by utilizing the laser with low intensity and low focusing degree (about 5 to 20 w) to burn on the surface of the egg with a deep color and can be used for marking producers and producing dates, etc. Two burning modes of lineation and lattice can be adopted by the method of the invention; the laser eggshell marking method has the characteristics of no poison, no pollution, quick operation, clear mark, no damage to the egg. By using laser to mark the egg, a consumer cannot identify the quality of the egg by shaking traditionally and can clearly know the brand and the quality guarantee period of the egg; besides, the relative information like an anti-counterfeiting code, and the like, can be added.

Still another prior art reference, such as Patent Publication No. WO2007/087116, teaches a method of marking an egg is disclosed and comprises applying radiant energy to the shell of an egg to cause discoloration of the eggshell, thereby forming a marking comprising at least a traceability code and a freshness date. Apparatus is also disclosed for applying markings on eggs being processed by an egg-handling machine that is designed and configured to transport a plurality of eggs therethrough, wherein the apparatus comprises a radiant energy source located in proximity to the egg-handling machine, the radiant energy source being configured to apply radiant energy to the eggs as the eggs are transported past the radiant energy source to selectively discolor the shell of the eggs and form markings on the shell, including a freshness date and a traceability code.

Alluding to the above, still another prior art reference, such as Patent Publication No. WO2008/115367, teaches an apparatus for laser marking individual objects with indicia at a marking station wherein a predetermined window exists during which each object can be marked as the objects are conveyed along at least one path at a predetermined speed, the apparatus comprising, at least first and second lasers positioned adjacent one or more paths configured to direct a laser beam onto the objects to mark the same with indicia as the objects pass through the marking station, with each of the first and second lasers marking alternate following objects as they pass through the marking station.

More recent prior art reference, such as, U.S. Pat. No. 8,823,758 teaches a system for laser marking eggs is disclosed comprising multiple laser marking apparatuses and a central server. The laser marking apparatuses are configured and arranged to perform laser marking jobs queued by local computers for laser marking eggs being packed by egg packing stations. The central server is configured to distribute the laser marking jobs to the local computers. In addition, a method is disclosed for controlling laser marking jobs which comprises distributing the laser marking jobs from a central computer to local computers responsible for queuing laser marking jobs to one or more laser marking apparatuses configured and arranged to laser mark information on eggs.

The issue of the prior art apparatus and method disclosed in U.S. Pat. No. 8,823,758 B2 is location and operation mode of photo sensor 216b and 216a or 214a or 214b. The problems happen in situation with the precise position of the photo sensor 216b and 216a or 214a or 214b is that the leading edge of a carton top, which is bent at the middle of the carton does not always allow the carton top to lay flat. This creates a situation where the precise photo eyes 216b and 216a or 214a and 214b do not see the carton and no laser marking occurs.

There is always a need for a novel system and method adaptable to improve and eliminate drawbacks associated with the aforementioned prior art systems and methods for laser marking of the objects, including and not limited to eggs.

SUMMARY OF THE INVENTION

An object marking system for marking one or more items, including a conveyor assembly having a conveyor line and a conveyor drive, the conveyor line is adapted to transport a container having the one or more items stored therein and including a first portion and a second portion, the second portion defining a marking position of the one or more items. A laser etching unit is disposed above at least the second portion of the conveyor line and having a laser engine unit and a scan head assembly communicatively connected to the laser engine unit.

A laser distance sensor configured to detect the one or more items by taking a distance measurement from and differentiating between a low surface and a high surface, wherein the low surface corresponds to a conveyor surface of the second portion that is positioned directly underneath the laser distance sensor, and wherein the high surface corresponds to a surface of the container that is supported by the second portion of the conveyor line.

An inductive proximity sensor is configured to cooperate with the laser distance sensor. A controller is configured to operatively control the laser etching unit, wherein the laser distance sensor is configured, when the one or more items are detected as being in the marking position, to transmit a signal to the controller adapted to activate the laser etching unit to laser etch or mark the one or more items stored in the container.

A method of marking one or more items by an object marking system having a conveyor assembly, a laser etching unit, a laser distance sensor, an inductive proximity sensor, and a controller is disclosed. The method includes delivering, via the conveyor assembly, a container having the one or more items stored therein, wherein the conveyor assembly includes a conveyor line and a conveyor drive, wherein the conveyor line includes a first portion and a second portion, the second portion defining a marking position of the one or more items.

The method further includes receiving the container on the second portion of the conveyor line followed by detecting, via the laser distance sensor, the one or more items by taking a distance measurement from and differentiating between a low surface and a high surface, wherein the low surface corresponds to a conveyor surface of the second portion that is positioned directly underneath the laser distance sensor, and wherein the high surface corresponds to a surface of the container that is supported by the second portion of the conveyor line.

The method further includes verifying positioning of the container by the laser distance sensor cooperating with the inductive proximity sensor; receiving by the controller a signal from the laser distance sensor followed by transmitting a command by the controller to generate an unfocused laser beam by the laser etching unit. The method further includes directing by the controller the unfocused laser beam through the laser etching unit to emit by the laser etching unit a focused laser beam; and marking the one or more items stored in the container by the focused laser beam.

A computer-readable medium is configured to store instructions for marking one or more items by an object marking system having a conveyor assembly, a laser etching unit, a laser distance sensor, an inductive proximity sensor, and a controller, the instructions comprising delivering, via the conveyor assembly, a container having the one or more items stored therein, the conveyor assembly having a conveyor line and a conveyor drive, the conveyor line including a first portion and a second portion, the second portion defining a marking position of the one or more items; receiving the container on the second portion of the conveyor line; detecting, via the laser distance sensor, the one or more items by measuring a distance from and differentiating between a low surface and a high surface, wherein the low surface corresponds to a conveyor surface of the second portion that is positioned directly underneath the laser distance sensor, and wherein the high surface corresponds to a surface of the container that is supported by the second portion of the conveyor line; verifying positioning of the container by the laser distance sensor cooperating with the inductive proximity sensor; receiving by the controller a signal from the laser distance sensor; transmitting a command by the controller to generate an unfocused laser beam by the laser etching unit; directing by the controller the unfocused laser beam through the laser etching unit to emit by the laser etching unit a focused laser beam; and marking the one or more items stored in the container by the focused laser beam.

An advantage of the present invention is to provide an inventive and improved method for laser marking of eggs adaptable to read directly from the top down with a laser position sensor and differentiate between a first surface (conveyor belt) and second surface, which is anything to be marked, such as, for example, eggs.

Another advantage of the present invention is to provide an inventive and improved method having a controller and a software with algorithm implementing a logic to ensure that the sensor is not blocked by analyzing the output of the laser distance sensor and ensuring a transition from low to high or the inverse high to low during each cycle, thereby ensuring that if the laser distance sensor has been blocked by a foreign object other than the material to be marked, it will not allow the marking to take place.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Because explicit identification of object-oriented constructs expressed through the syntax of high-level object-oriented programming languages is lost during compilation to binary code (e.g., translation of a source code definition or representation of an application to a binary code definition or representation of the application such as a machine code or byte-code definition), potential security vulnerabilities can be obscured during static analysis of the resulting binary code.

For example, because information about an object (e.g., the class on which the object is based, the size of the object, the number and types or sizes of properties of the object, and the number of functionalities accessible to the object via a dispatch table) is typically not expressed in binary code, determining whether indirect operations relative to the object expose security vulnerabilities can be difficult without the source code from which the binary code was generated.

As a specific example, an indirect operation can result in arbitrary code execution security vulnerabilities if the binary code does not include run-time validation to ensure that the indirect operation does not operate outside or beyond the object (i.e., at memory addresses not allocated to or shared by the object). Some binary code representations of applications, however, do include information about objects. Such information can be included in binary code as run-time type information (RTTI) or debugging information that is compiled into the binary code.

Nevertheless, because the binary code representations of many applications do not include such information (e.g., to discourage reverse engineering of these applications), robust methodologies and systems for analyzing binary code based on (or derived from) source code using object-oriented techniques should not assume availability of such information.

Implementations discussed herein analyze operations described in binary code to identify objects based on those operations. Said differently, implementations discussed herein reconstruct, at least partially, objects (or representations of objects) by inferring the structure of such objects based on operations described in binary code.

Furthermore, implementations discussed herein perform security vulnerability analyses of binary code representations of applications using such objects. For example, implementations discussed herein can identify security vulnerabilities such as type confusion vulnerabilities that can result in arbitrary code execution, code injection, application failure, or other undesirable or unintended behavior of an application using information about objects identified by analysis of operations described in binary code.

Accordingly, implementations discussed herein with reference to analysis of operations described in binary code should be understood to refer to analysis of those operations using a binary code representation of a software module or a representation of the software module derived from the binary code representation.

A variable within a memory is a memory location at which one or more values can be stored. Such a memory location can be at a processor memory (e.g., a register or cache), at a system memory (e.g., a Random Access Memory (RAM) of a computing system), or at some other memory. Operations within binary code that operate on such variables can refer to a memory address (either absolute or relative to another memory address such as an offset from a stack pointer) of that memory location. Thus, the identifier (e.g., memory address) of an object can be stored as a value at a memory location with a memory address that is used by operations within the binary code.

Accordingly, as used herein, terms such as "identifier of an object" and "memory address of an object" should be understood to refer to the identifier (e.g., memory address) itself or to a variable at which a value representing the identifier is stored. As used herein, the term "module" refers to a combination of hardware (e.g., a processor such as an integrated circuit or other circuitry) and software (e.g., machine- or processor-executable instructions, commands, or code such as firmware, programming, or object code).

A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Figure 1:
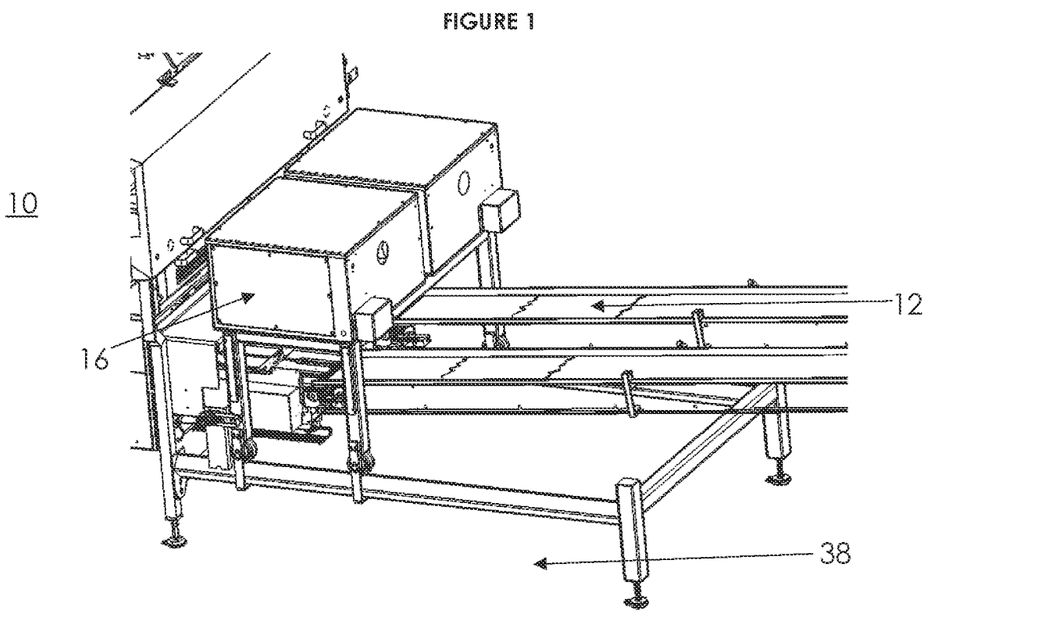
FIG. 1 is an environmental view of an object marking system of the present invention.
Figure 1A:
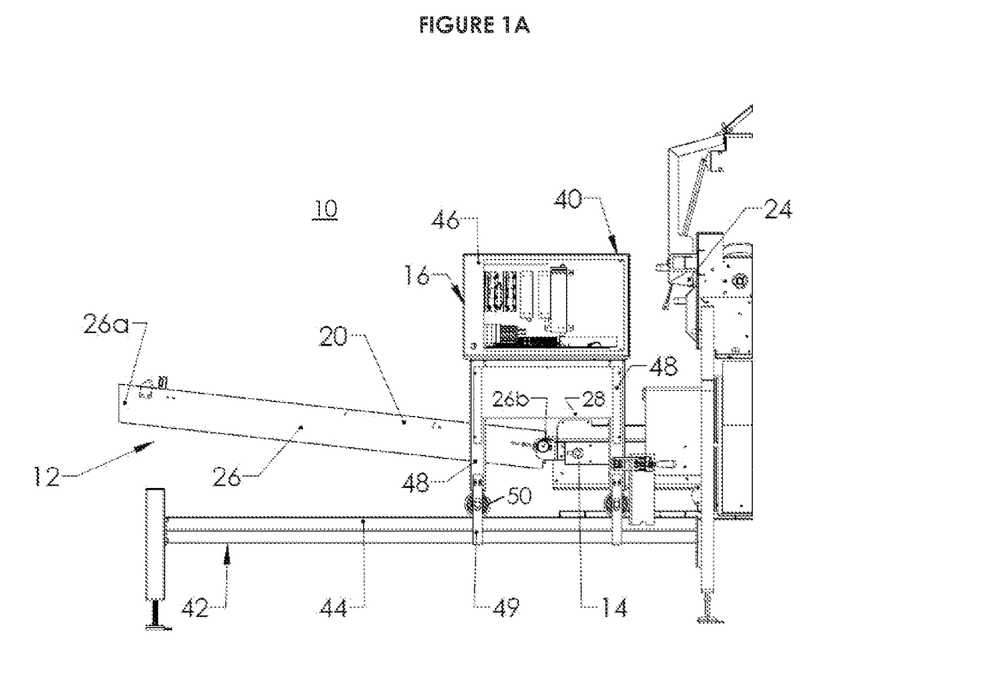
FIG. 1A is a side elevation view of the object marking system illustrated in FIG. 1.
Figure 2:
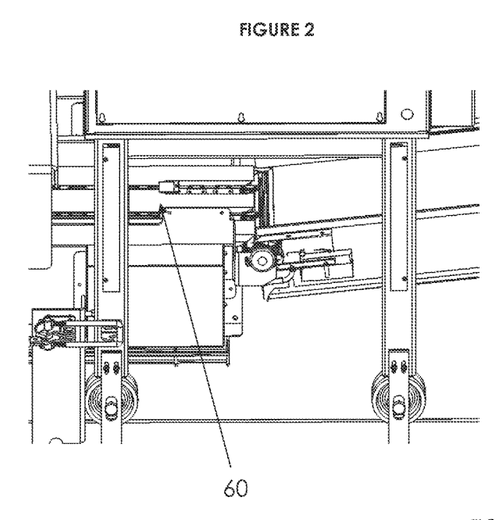
FIG. 2 is a perspective side view of a low surface region measured by a laser marking assembly of the object marking system of FIG. 1.
Figure 2A:
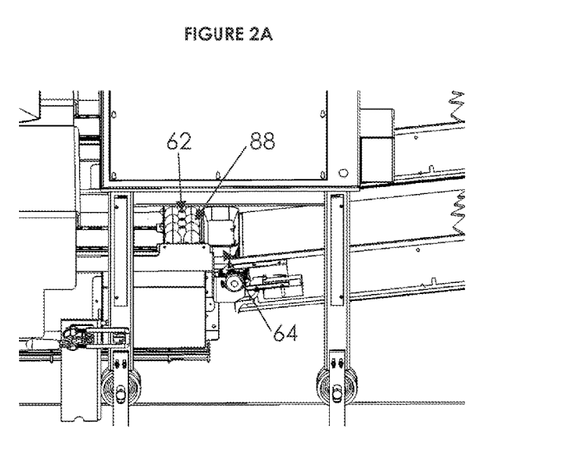
FIG. 2A is a perspective side view of a high surface region measured by the laser marking assembly of the object marking system of FIG. 1.

Referring now to the drawings and the illustrative embodiments depicted therein, an object marking system 10, as shown in FIGS. 1 and 1A, is provided for efficient and automatic marking or etching of one or more items 88, such as for example one or more eggs, as shown in FIG. 2A. Returning to FIG. 1A, the object marking system 10 includes a conveyor assembly 12, an inductive proximity sensor 14 operatively connected to the conveyor assembly 12, and a laser marking assembly 16.

Figure 2B:
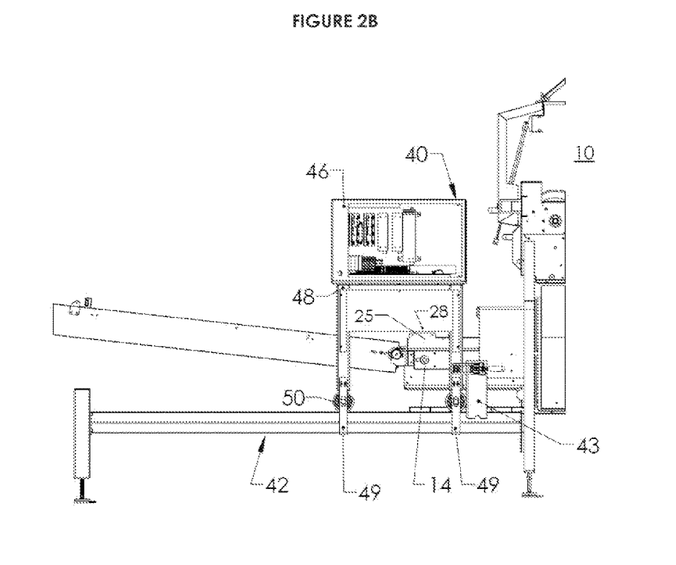
FIG. 2B is another side elevation view of the object marking system of FIG. 1.
Figure 3:
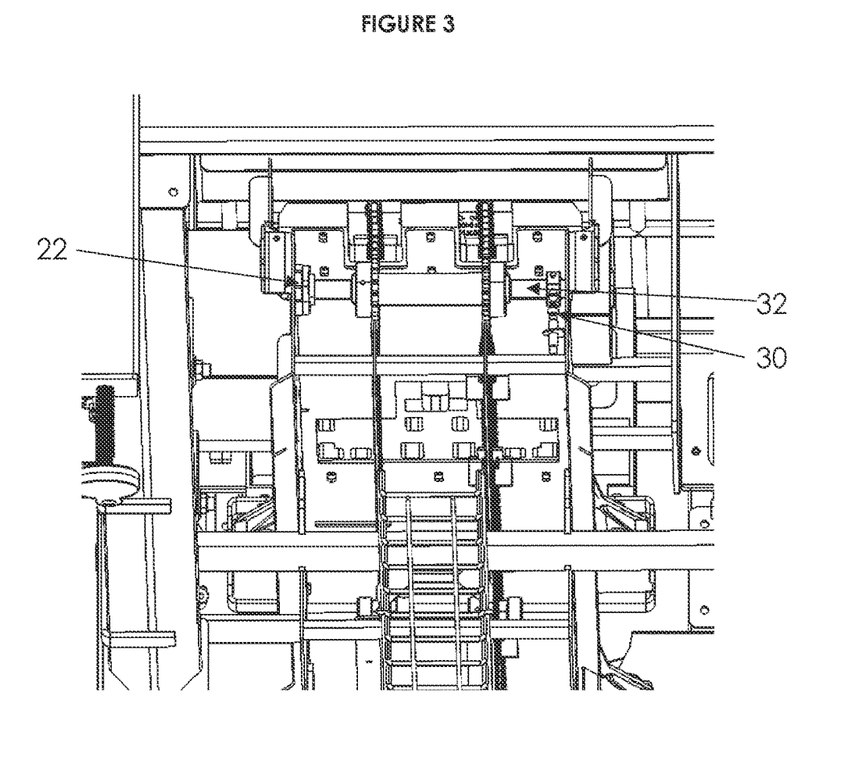
FIG. 3 is a partial perspective view of a conveyor assembly of the object marking system of FIG. 1, showing a collar with a bolt protruding to turn on an inductive proximity sensor output.

With reference to FIGS. 1, 1A and 3, the conveyor assembly 12 includes a conveyor line 20, a conveyor drive 22, and associated controls 24. The conveyor line 20 includes a first portion 26 that may include movable means, such as a conveyor belt, one or more rollers or the like, to facilitate transportation or delivery of an item from a distal end 26a to a proximal end 26b of the first portion 26 of the conveyor line 20. The conveyor line 20 also includes a second portion 28, best seen in FIGS. 1A and 2B, that serves as a platform for and defines a marking position 25 of the one or more items 88. The second portion 28 may also include a movable track, belt, rollers or the like. As can be seen in FIG. 1A, the second portion 28 is connected to the proximal end 26b of the first portion 26, and the first portion 26 of the conveyor line 20 is preferably tilted towards the proximal end 26b. The second portion 28, however, is generally horizontal, and thus the first and second portions 26 and 28 preferably lie in different planes.

As best seen in FIGS. 1A and 2B, the inductive proximity sensor 14 is operatively connected to the second portion 28 of the conveyor line 20. The inductive proximity sensor 14 is configured to serve as a conveyor position sensor that verifies a relative position of movable means of the conveyor line 20 and/or a relative position of the one or more items 88 traveling via the conveyor line 20 to be marked. Non-limiting examples of a sensor that may serve as the inductive proximity sensor 14 may include a photo eye, through beam, capacitive sensor, rotary position sensor, or any position sensor capable of accurately detecting the position of the conveyor and/or the one or more items 88. The relevant position is verified by a tab or bolt 30 protruding or extending from a shaft 32 of the conveyor drive 22, as shown in FIG. 3. More specifically, the tab 30 is configured to activate the inductive proximity sensor 14 when the one or more items 88 are specifically at, near, or in the marking position 25. As such, the relative position of the one or more items 88 with respect to the marking position 25 is established with desired accuracy.

When using the inductive proximity sensor 14, the tab 30 is configured to align with the detection field of the sensor 14 near the conveyor shaft 32. The activation of the sensor 14 is caused by detection of magnetic loss due to eddy currents that are generated on a conductive surface by an external magnetic field. This activation is only occurring when the conveyor is positioned in the proper marking location for the one or more items 88, such as the marking position 25. The tab 30 is thus configured to actuate or activate an output of the inductive proximity sensor 14. It will be understood that the tab 30 can be a bolt, a mounted metal strip, or any metallic protrusion that can be used to accurately detect conveyor position when using the sensor 14 in conjunction with the tab 30, thereby verifying that the one or more items 88 are in the marking position 25. It will be further understood that the inductive proximity sensor 14 only verifies the position of the conveyor line 20. However, when the inductive proximity sensor 14 is used in conjunction or cooperation with the laser distance sensor 56, the presence and/or exact positioning/location of the one or more items 88 is accurately determined.

Figure 3A:
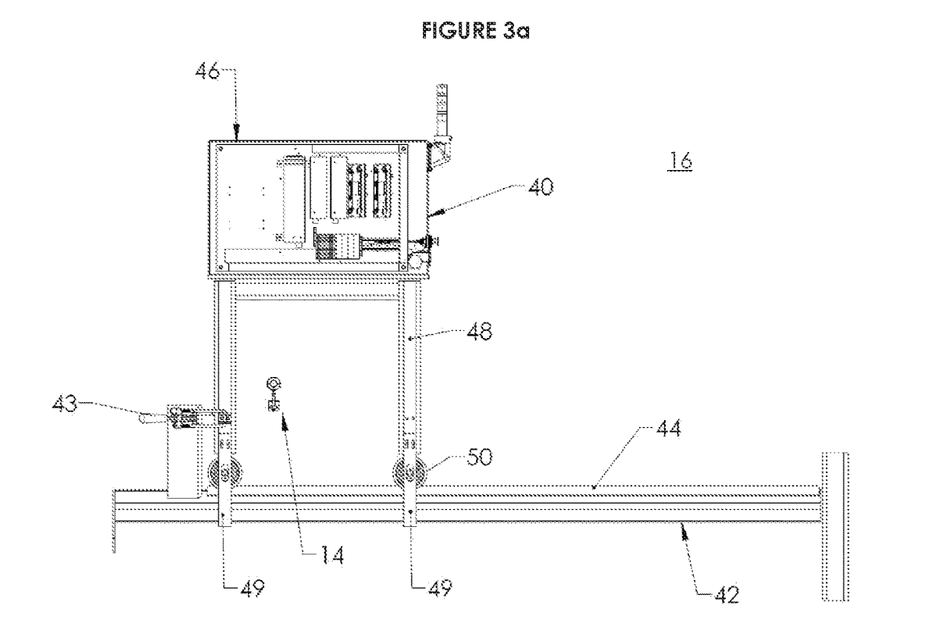
FIG. 3A is a side elevation view of the object marking system of FIG. 1, illustrated without the conveyor assembly.

With reference to FIGS. 1, 1A, 2B and 3A, the laser marking assembly 16 includes a laser etching or marking machine or unit 40 and a track assembly 42. The track assembly 42 includes a pair of track rails 44 that are spaced from and extend generally parallel to a support surface 38, such as a floor. The track assembly 42 further includes at least one locking mechanism 43, as shown in FIGS. 2A and 3A. The laser etching unit 40 includes a housing 46 and a plurality of supporting legs 48. One end of each supporting leg 48 extends from a bottom surface of the housing 46 and another end includes a wheel 50 configured to roll, slide or move along respective one of the track rails 44, and may also include a safety arm 49 that at least partially wraps around respective one of the track rails 44, thereby preventing the laser etching unit 40 from rolling off or derailing the track rails 44 or from tilting over. As can be best seen in FIG. 3A, each locking mechanism 43 is configured to lock or secure at least one supporting leg 48 to fixedly position the housing 46 of the laser etching unit 40 over the marking position 25 of the one or more items 88.

It will be understood that when the laser marking assembly 16 is installed over the conveyor assembly 12, as shown in FIG. 1, the conveyor line 20 extends between the supporting legs 48 and under the housing 46 of the laser etching unit 40. Since it should be understood that the laser etching unit 40 can selectively roll along the track rails 44, it should also be apparent that the laser etching unit 40 can selectively move along the conveyor line 20 such that the housing 46 of the laser etching unit 40 can be positioned over the second portion 28 or near the distal end 26a of the conveyor line 20. It should further be appreciated that during the etching or marking operation of the object marking system 10, the housing 46 of the laser etching unit 40 is fixedly positioned directly above the second portion 28 of the conveyor line 20. However, when the etching or marking operation is stopped or paused, the laser etching unit 40 can be moved to create space, for example, for cleaning of the marking position 25 of the one or more items 88 or perform repairs of the associated controls 24 or other parts of the conveyor assembly 12.

Figure 4:
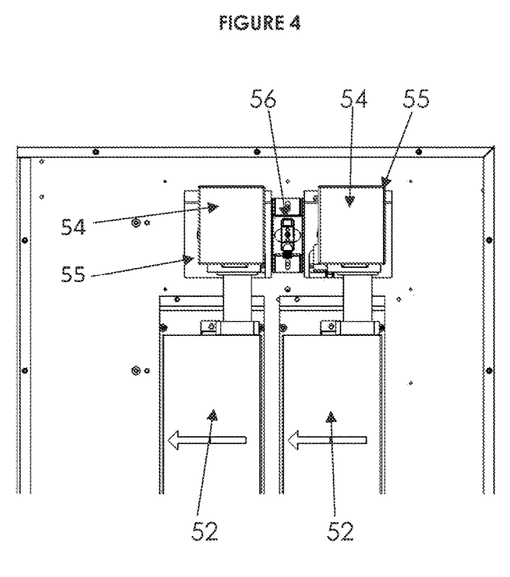
FIG. 4 is a top view of a portion of a laser etching unit of the laser marking assembly, illustrating a portion of a pair of laser engine units, a pair of scan head assemblies and a laser distance sensor.
Figure 4A:
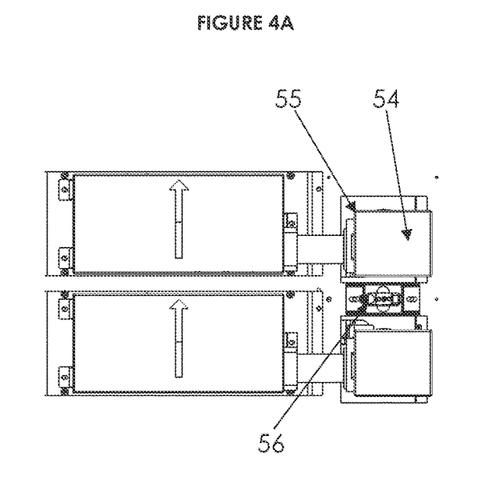
FIG. 4A is a side perspective view of one of the pair of scan head assemblies and the laser distance sensor illustrated in FIG. 4.
Figure 4B:
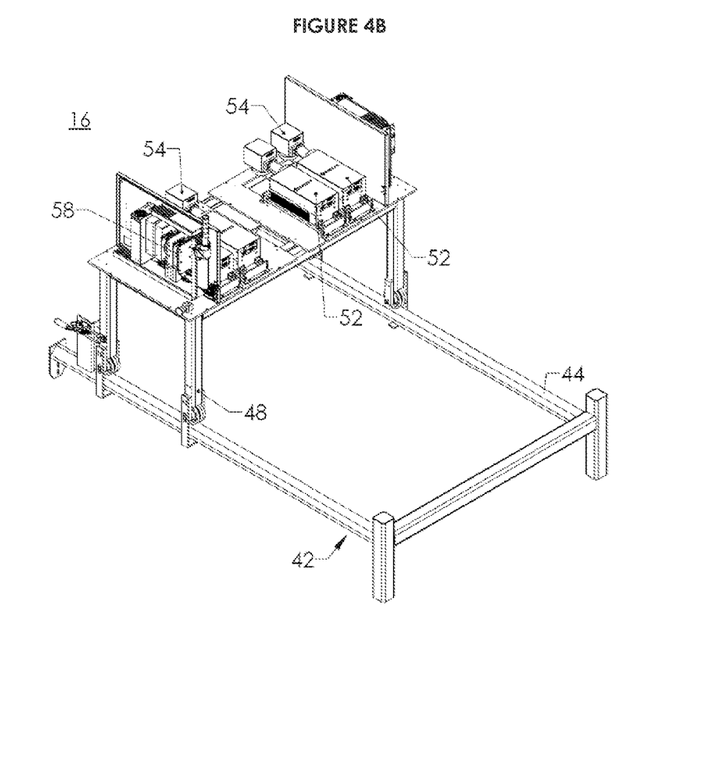
FIG. 4B is a top perspective view of the object marking system of FIG. 1, illustrated without the conveyor assembly and showing the laser etching unit without a top cover.
Figure 5:
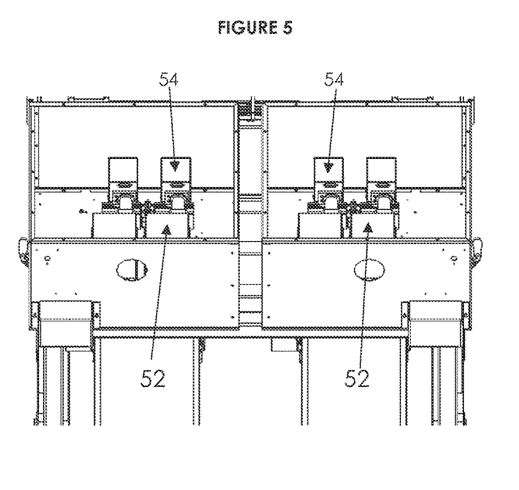
FIG. 5 is a top perspective view of a pair of laser etching units, each illustrated without a top cover.
Figure 5A:
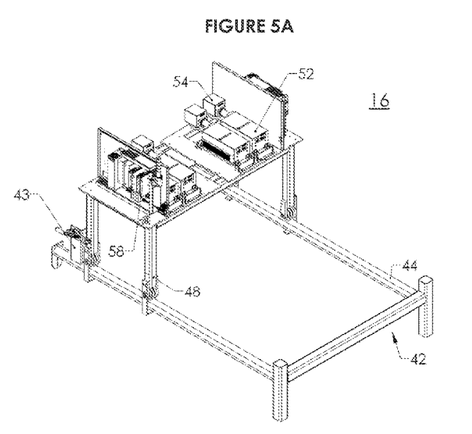
FIG. 5A is a top perspective view of the object marking system of FIG. 1, illustrated without the conveyor assembly and showing the laser etching unit without a top cover.
Figure 5B:
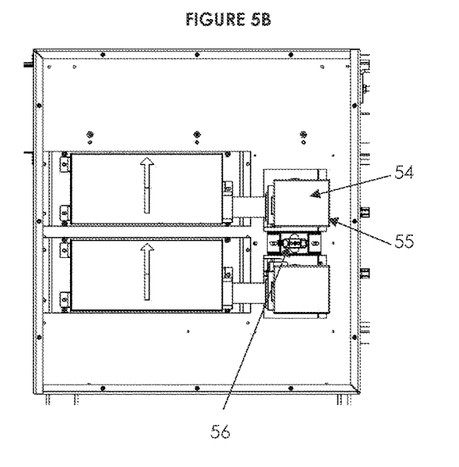
FIG. 5B is another side perspective view of one of the pair of scan head assemblies and the laser distance sensor illustrated in FIG. 4.

As best shown in FIGS. 4-5A, the housing 46 of the laser etching unit 40 includes a laser engine unit 52, a scan head assembly 54 that is communicatively connected to the laser engine unit 52, a laser distance sensor 56, and a controller 58 configured to operatively control the laser etching unit 52, as well as other electrical components of the laser etching unit 40. In an alternative embodiment, the housing 46 includes a pair of laser engine units 52 and scan head assemblies 54 with the laser distance sensor 56 disposed therebetween, as can be seen in FIGS. 4B and 5A. Turning back to FIGS. 2 and 2A, the laser distance sensor 56 is configured to cooperate and/or communicate with the inductive proximity sensor 14 and further configured to detect the one or more items 88 under the laser etching unit 40 by taking a distance measurement between the sensor 56 and a low surface 60 and between the sensor 56 and a high surface 62. Accordingly, the laser distance sensor 56 is able to differentiate between the low and high surfaces 60, 62.

It is contemplated within the scope of the present disclosure that the low surface 60 corresponds to a conveyor surface of the second portion 28, and that the high surface 62 corresponds to a surface of an open container 64, such as an open egg carton, that contains the one or more items 88 stored therein. More specifically, the high surface 62 is envisioned to be the top-most surface of the open container 64, such as the top-most surface of the egg carton that is disposed between dimples of the egg carton.

Alluding to the above, the laser distance sensor 56, in cooperation with the inductive proximity sensor 14, ensures or verifies that the open container 64 is "in position" and that the one or more items 88 are in the marking position 25, i.e., ready to be marked or etched. It is further noted that, when the one or more items 88 are detected as being in the marking position 25, the laser distance sensor 56 reads or measures vertically top down, with the second portion 28 of the conveyor line 20 being positioned directly underneath the scan head assembly 54 and the laser distance sensor 56.

Figure 5C:
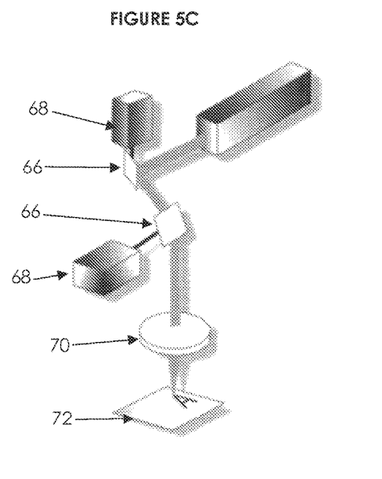
FIG. 5C is a side view of optical components of each of the pair of scan head assemblies illustrated in FIG. 4.

With continued reference to FIGS. 4-5C, the etching or marking operation of the laser etching unit 40 will now be described in more detail. When the laser distance sensor 56 verifies that the one or more items 88 are in the marking position 25, the laser distance sensor 56 is configured to transmit a signal to the controller 58 that is adapted to activate the laser engine unit 52 to generate a laser beam of at least 350 nm wavelength (can we also include "or any other wavelength"? Our concern would be if there were some future necessity to utilize 340 or some lower wavelength) to laser etch or mark the one or more items 88 stored in the container 64. In response to the signal received from the controller 58, the engine laser unit 52 generates emission of an unfocused laser beam that the engine laser unit 52 emits to the scan head assembly 54. The scan head assembly 54, in turn, is configured to emit a focused laser beam onto the one or more items 88 in the container 64.

The scan head assembly 54 is communicatively connected to the engine laser unit 52 to receive an unfocused laser beam generated by the engine laser unit 52. The scan head assembly 54 includes a housing 55, as shown in FIGS. 4 and 4A, that contains one or more mirrors 66 (FIG. 5C) each mounted on a galvanometer-based scanning motor 68. The one or more mirrors 66 are used to direct the unfocused laser beam into a focusing lens 70 of the scan head assembly 54 to produce an X/Y positional control of a focused laser beam and mark the one or more items 88 with a laser pattern 72. It is contemplated that the laser pattern 72 can be selected from a number of predetermined patterns or created/generated by the controller 58 based on input from a user.

The housing 55 of the scan head assembly 54 includes an aperture (not shown) that serves as the focusing lens 70 to output the laser pattern 72 selected by the controller 58 and mark the one or more items 88 stored in the container 64. The controller 58 is configured to actuate or direct the one or more mirrors 66 in the scan head assembly 54 to move the unfocused laser beam about a focal X/Y plane. The controller 58 is further configured, in response to the signal from the laser distance sensor 56, to activate and deactivate the engine laser unit 52 or "change states" based on presence or absence of the container 64 in the marking position 25 as signaled by the laser distance sensor 56.

Figure 7:
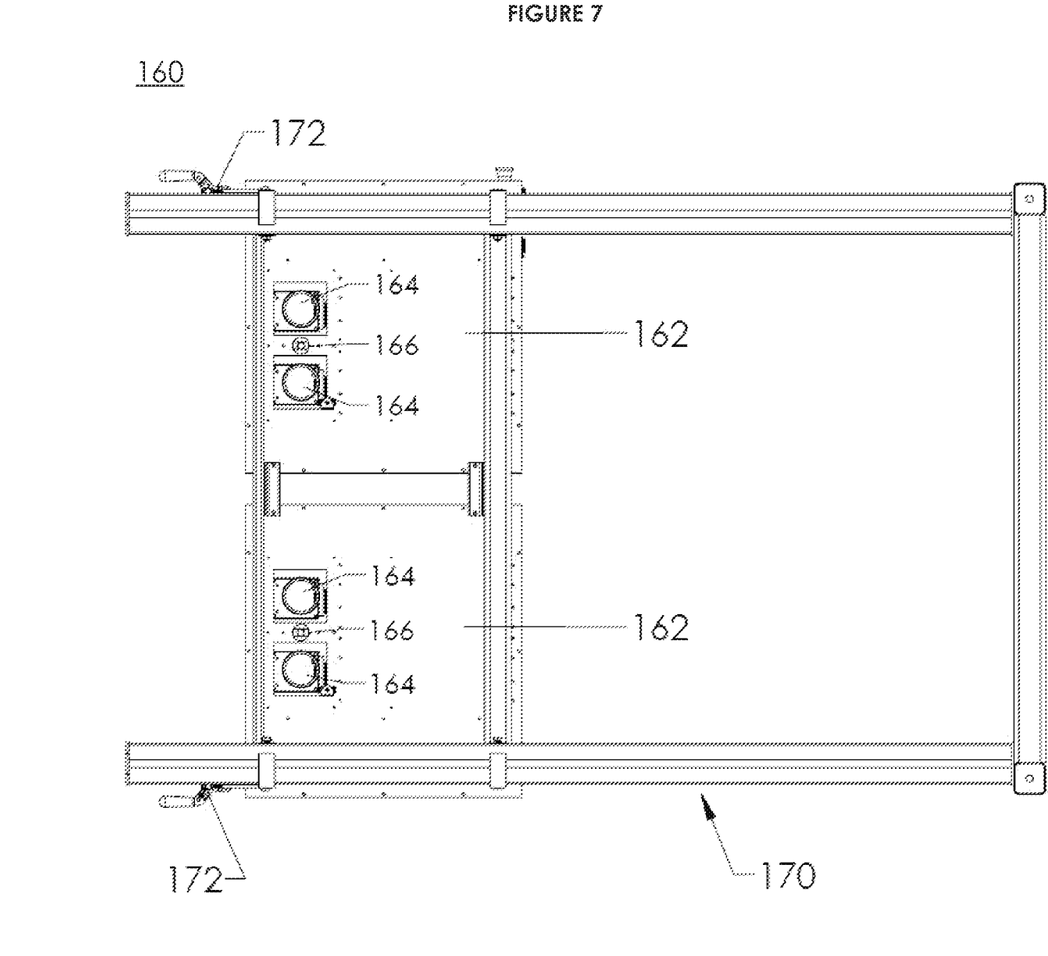
FIG. 7 is a top view of another laser marking assembly, illustrated without laser engine units.
Figure 8:
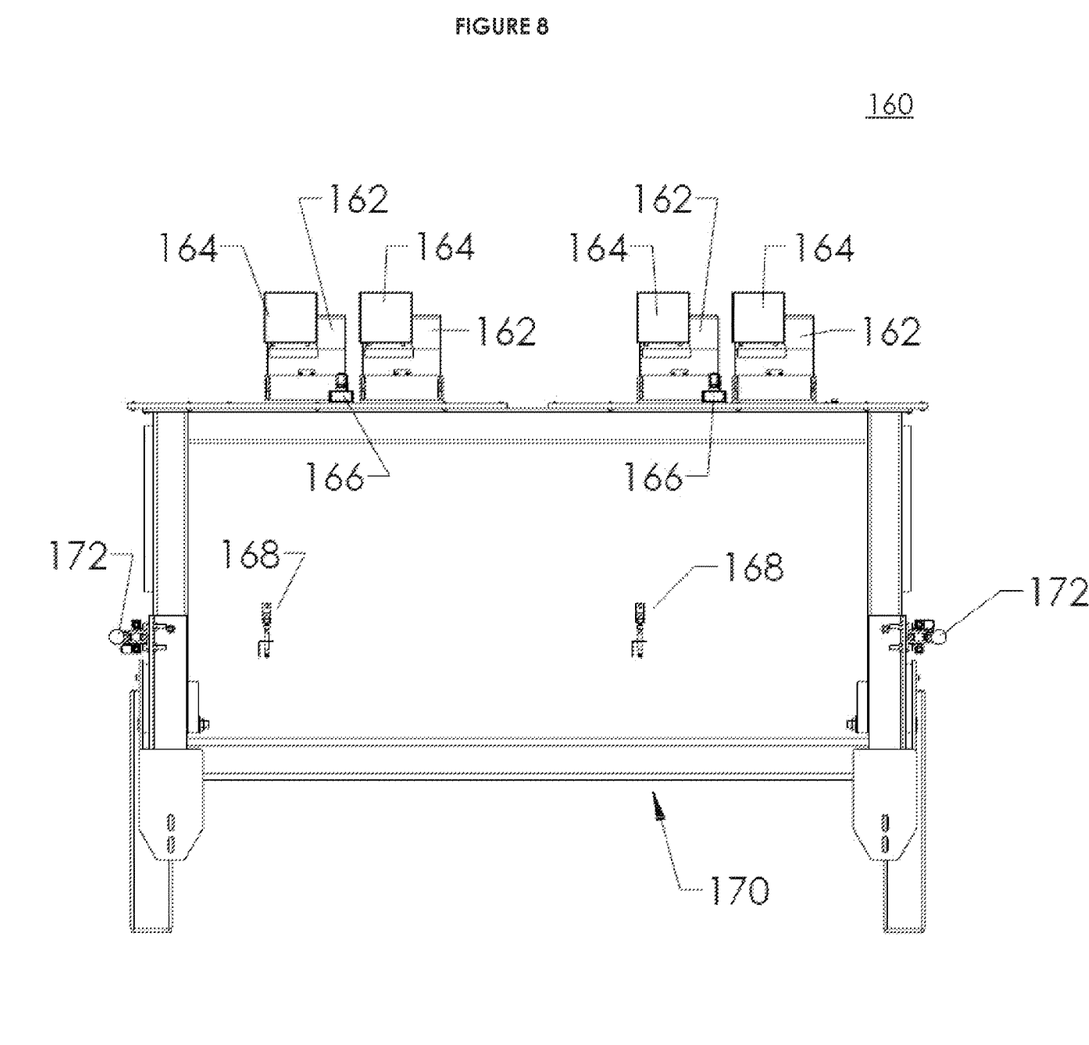
FIG. 8 is a front elevation view of the laser marking assembly illustrated in FIG. 7.
Figure 9:
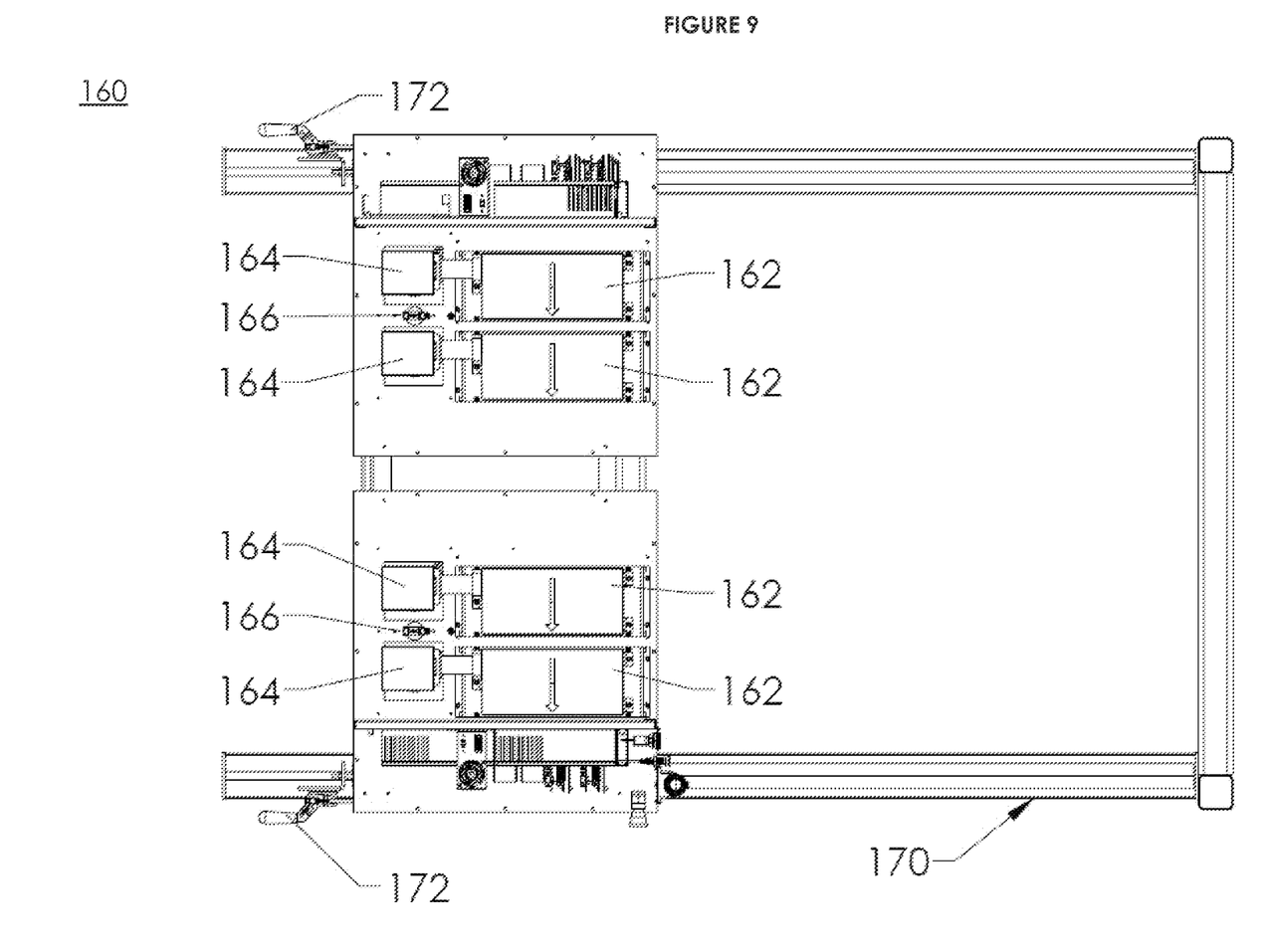
FIG. 9 is a top view of the laser marking assembly of FIG. 7, illustrated with laser engine units.

Now turning to FIGS. 7-9, a laser marking assembly 160 for use with one or more conveyor assemblies for efficient and automatic marking or etching of one or more items 88, such as one or more eggs, is shown. The laser marking assembly 160 is substantially similar to the laser marking assembly 16 except that the laser marking assembly 160 includes at least a pair of laser etching units 162 in a side-by-side arrangement. Each of the pair laser etching units 162 is substantially similar to the laser etching unit 40 described in detail above, and thus will not be described herein in detail. Each of the pair of laser etching units 162 includes a pair of laser engine units 162 each connected to a scan head assembly 164, and a laser distance sensor 166 disposed between each pair of scan head assemblies 164. The laser marking assembly 160 further includes an inductive proximity sensor 168 disposed below each of the pair of laser etching units 162 (FIG. 8). The pair of laser etching units 162 is movably supported by a track assembly 170 of the laser marking assembly 160, but can be fixedly secured to a desired location by one or more locking mechanisms 172.

Figure 6:
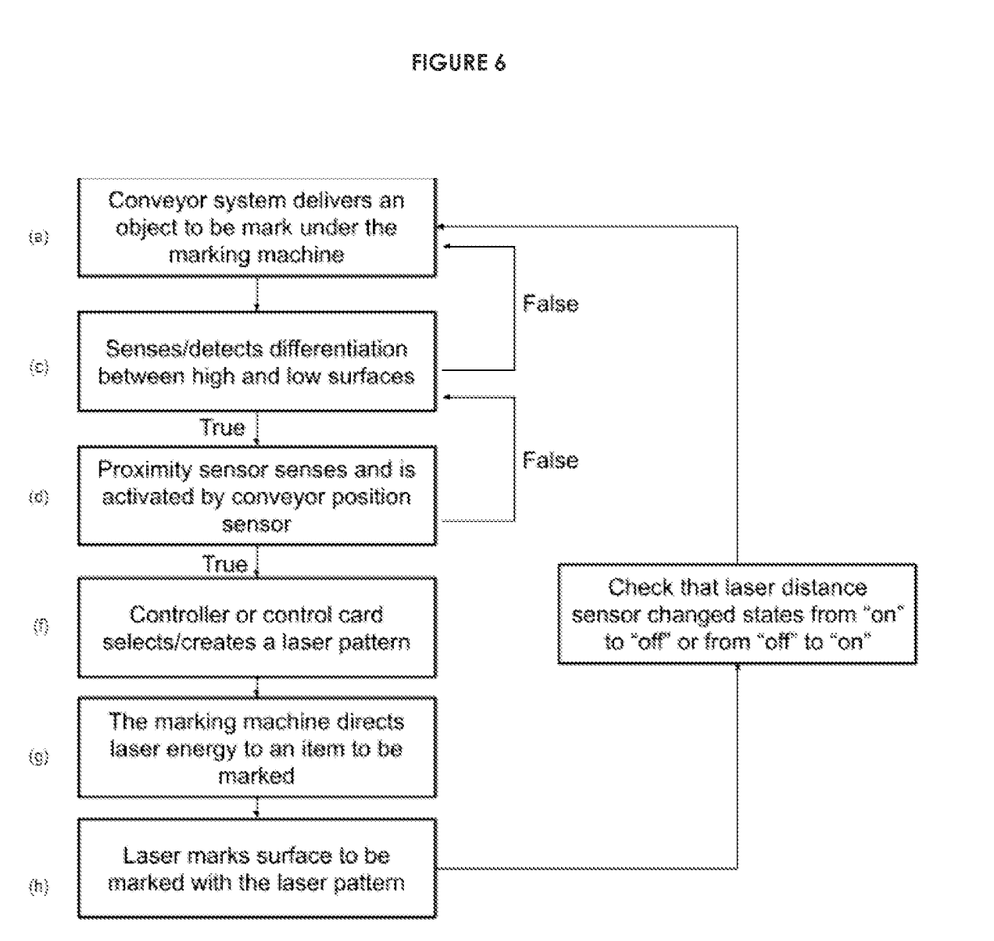
FIG. 6 is a schematic diagram of steps of a method of the present invention.

Turning now to FIG. 6, a method of marking the one or more items 88 by the object marking system 10, having the conveyor assembly 12, the laser etching unit 40, the laser distance sensor 56, the inductive proximity sensor 14, and the controller 58, includes the steps of (a) delivering, via the conveyor assembly 12, the container 64 having the one or more items 88 stored therein, (b) receiving the container on the second portion 28 of the conveyor line 20, (c) detecting, via the laser distance sensor 56, the one or more items 88 by taking a distance measurement from a low surface and a high surface. The low surface being a conveyor surface of the second portion 28, and the high surface being a surface of the container 64 that is supported by the second portion 28 of the conveyor line 20. The method further includes (d) verifying positioning of the container 64 by the laser distance sensor 56 cooperating with the inductive proximity sensor 14, (e) receiving by the controller 58 a signal from the laser distance sensor 56, (f) transmitting a command by the controller 58 to generate an unfocused laser beam by the laser etching unit 40, (g) directing by the controller 58 the unfocused laser beam through the laser etching unit 40 to emit by the laser etching unit 40 a focused laser beam, and (h) marking the one or more items 88 stored in the container 64 by the focused laser beam.

A computer-readable medium configured to store instructions for marking one or more items by an object marking system having a conveyor assembly, a laser etching unit, a laser distance sensor, an inductive proximity sensor, and a controller, the instructions comprising delivering, via the conveyor assembly, a container having the one or more items stored therein, the conveyor assembly having a conveyor line and a conveyor drive, the conveyor line including a first portion and a second portion, the second portion defining a marking position of the one or more items; receiving the container on the second portion of the conveyor line; detecting, via the laser distance sensor, the one or more items by measuring a distance from and differentiating between a low surface and a high surface, wherein the low surface corresponds to a conveyor surface of the second portion that is positioned directly underneath the laser distance sensor, and wherein the high surface corresponds to a surface of the container that is supported by the second portion of the conveyor line; verifying positioning of the container by the laser distance sensor cooperating with the inductive proximity sensor; receiving by the controller a signal from the laser distance sensor.

The computer-readable medium is further configured to store instructions for transmitting a command by the controller to generate an unfocused laser beam by the laser etching unit, directing by the controller the unfocused laser beam through the laser etching unit to emit by the laser etching unit a focused laser beam, and followed by marking the one or more items stored in the container by the focused laser beam.

The computer-readable medium is further configured to store instructions for configuring the tab, when the one or more items are in the marking position, to align with and activate the inductive proximity sensor that is configured to communicate the positioning to the laser distance sensor and selecting or creating by the controller, when the one or more items are in the marking position, a laser pattern. The computer-readable medium is further configured to store instructions for directing the laser etching unit to generate the unfocused laser beam, wherein the laser etching unit includes a laser engine unit and a scan head assembly communicatively connected thereto, and wherein the laser engine unit generates the unfocused laser beam, and receiving by the scan head assembly the unfocused laser beam from the laser engine unit.

The computer-readable medium is further configured to store instructions for controlling by the controller an angular positioning of the unfocused laser beam and directing the unfocused laser beam to an aperture of the scan head assembly, focusing the unfocused laser beam by a focusing lens mounted in the aperture, activating by the controller, in response to a presence of a high surface signal from the laser distance sensor, the engine laser unit to generate the unfocused laser beam, and deactivating by the controller, in response to an absence of the high surface signal from the laser distance sensor, the engine laser unit to cease an emission of the unfocused laser beam, wherein the presence or absence of the high surface signal is based on presence or absence of the container in the marking position.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A non-transitory computer-readable medium configured to store instructions for marking one or more items by an object marking system having a conveyor assembly, a laser etching unit, a laser distance sensor, an inductive proximity sensor, and a controller, the instructions comprising:
   delivering, via the conveyor assembly, a container having the one or more items stored therein, the conveyor assembly having a conveyor line and a conveyor drive, the conveyor line including a first portion and a second portion, the second portion defining a marking position of the one or more items;
   receiving the container on the second portion of the conveyor line;
   detecting, via the laser distance sensor, the one or more items by measuring a distance from and differentiating between a low surface and a high surface, wherein the low surface corresponds to a conveyor surface of the second portion that is positioned directly underneath the laser distance sensor, and wherein the high surface corresponds to a surface of the container that is supported by the second portion of the conveyor line;
   verifying positioning of the container by the laser distance sensor cooperating with the inductive proximity sensor;
   receiving by the controller a signal from the laser distance sensor;
   transmitting a command by the controller to generate an unfocused laser beam by the laser etching unit;
   directing by the controller the unfocused laser beam through the laser etching unit to emit by the laser etching unit a focused laser beam; and
   marking the one or more items stored in the container by the focused laser beam.

2. The non-transitory computer-readable medium configured to store the instructions as set forth in claim 1, the instructions further comprising:
   configuring a tab, when the one or more items are in the marking position, to align with and activate the inductive proximity sensor that is configured to communicate the positioning to the laser distance sensor.

3. The non-transitory computer-readable medium configured to store the instructions as set forth in claim 2, the instructions further comprising:
   selecting or creating by the controller, when the one or more items are in the marking position, a laser pattern; and
   directing the laser etching unit to generate the unfocused laser beam, wherein the laser etching unit includes a laser engine unit and a scan head assembly communicatively connected thereto, and wherein the laser engine unit generates the unfocused laser beam.

4. The non-transitory computer-readable medium configured to store the instructions as set forth in claim 3, the instructions further comprising:
   receiving by the scan head assembly the unfocused laser beam from the laser engine unit; controlling by the controller an angular positioning of the unfocused laser beam and directing the unfocused laser beam to an aperture of the scan head assembly; and
   focusing the unfocused laser beam by a focusing lens mounted in the aperture.

5. The non-transitory computer-readable medium configured to store the instructions as set forth in claim 4, the instructions further comprising:
   activating by the controller, in response to a presence of a high surface signal from the laser distance sensor, the laser engine unit to generate the unfocused laser beam; and deactivating by the controller, in response to an absence of the high surface signal from the laser distance sensor, the laser engine unit to cease an emission of the unfocused laser beam, wherein the presence or absence of the high surface signal is based on presence or absence of the container in the marking position.

6. A non-transitory computer-readable medium configured to store instructions for marking one or more items by an object marking system having a conveyor assembly, a laser etching unit, a laser distance sensor, an inductive proximity sensor, and a controller, the instructions comprising:

delivering, via the conveyor assembly, a container having the one or more items stored therein, the conveyor assembly having a conveyor line and a conveyor drive, the conveyor line including a first portion and a second portion, the second portion defining a marking position of the one or more items;

receiving the container on the second portion of the conveyor line;

detecting, via the laser distance sensor, the one or more items by measuring a distance from and differentiating between a low surface and a high surface, wherein the low surface corresponds to a conveyor surface of the second portion that is positioned directly underneath the laser distance sensor, and wherein the high surface corresponds to a surface of the container that is supported by the second portion of the conveyor line;

verifying positioning of the container by the laser distance sensor cooperating with the inductive proximity sensor;

receiving by the controller a signal from the laser distance sensor;

transmitting a command by the controller to generate an unfocused laser beam by the laser etching unit;

directing by the controller the unfocused laser beam through the laser etching unit to emit by the laser etching unit a focused laser beam;

marking the one or more items stored in the container by the focused laser beam;

configuring a tab, when the one or more items are in the marking position, to align with and activate the inductive proximity sensor that is configured to communicate the positioning to the laser distance sensor;

selecting or creating by the controller, when the one or more items are in the marking position, a laser pattern;

directing the laser etching unit to generate the unfocused laser beam, wherein the laser etching unit includes a laser engine unit and a scan head assembly communicatively connected thereto, and wherein the laser engine unit generates the unfocused laser beam;

receiving by the scan head assembly the unfocused laser beam from the laser engine unit;

controlling by the controller an angular positioning of the unfocused laser beam and directing the unfocused laser beam to an aperture of the scan head assembly;

focusing the unfocused laser beam by a focusing lens mounted in the aperture;

activating by the controller, in response to a presence of a high surface signal from the laser distance sensor, the laser engine unit to generate the unfocused laser beam;

deactivating by the controller, in response to an absence of the high surface signal from the laser distance sensor, the laser engine unit to cease an emission of the unfocused laser beam, wherein the presence or absence of the high surface signal is based on presence or absence of the container in the marking position.

\* \* \* \* \*